United States Patent [19]

Wills

[11] 4,102,389
[45] Jul. 25, 1978

[54] HEAT PUMP CONTROL SYSTEM

[75] Inventor: Frank Eugene Wills, York, Pa.

[73] Assignee: Borg-Warner Corporation, Chicago, Ill.

[21] Appl. No.: 732,674

[22] Filed: Oct. 15, 1976

[51] Int. Cl.$^2$ .............................................. F25B 13/00
[52] U.S. Cl. ...................................... 165/29; 62/158;
62/160; 318/484
[58] Field of Search ................ 62/231, 158, 155, 140;
165/29; 318/484; 307/141.4; 323/75 H; 236/78 D

[56] References Cited

U.S. PATENT DOCUMENTS

| 1,582,702 | 4/1926 | Stoekle et al. ...................... 323/75.5 |
| 3,783,369 | 1/1974 | Chambers .......................... 236/78 D |
| 3,946,574 | 3/1976 | Portera ................................ 62/158 |
| 3,993,121 | 11/1976 | Medlin et al. ......................... 165/29 |
| 3,996,998 | 12/1976 | Garst et al. ....................... 165/29 X |

Primary Examiner—William E. Wayner
Attorney, Agent, or Firm—James J. Jennings

[57] ABSTRACT

A control system for regulating operation of a heat pump includes a basic timer circuit which is utilized in different ways for different purposes. The system senses pressure across the outdoor coil, outdoor temperature, temperature in the liquid line to and from the outdoor coil, and temperature of the compressor discharge line. The control system initiates a defrost cycle for the outdoor coil responsive to a high static pressure across the outside coil, at the same time that the liquid line temperature is below a preset temperature. The defrost cycle is terminated when the liquid line temperature reaches a given temperature or when that liquid line temperature has been at a lower temperature for a certain time interval as determined by the basic timer circuit. When the compressor is shut down, the timer is also started to ensure that the compressor is not brought back on before the expiration of the basic shut-down time interval. In addition the compressor cannot be operated when the outside temperature is at or below whatever temperature is determined by the standby heat setting. The compressor likewise cannot be operated when there is a second call for defrost within a given time interval, or a high temperature in the compressor discharge line. The compressor cannot be restarted after a power failure until a preset time interval has elapsed.

8 Claims, 4 Drawing Figures

HEAT PUMP CONTROL SYSTEM

BACKGROUND OF THE INVENTION

In general a heat pump system includes a reversing valve to change the connection from the compressor discharge line to the indoor coil or the outdoor coil, to change the respective functions of these coils from a condenser to an evaporator, and from an evaporator to a condenser. As the heat pumps have received greater acceptance, efforts have been made to improve their control systems. One problem frequently encountered has been associated with the accumulation of ice on the outdoor coil when the outside air temperature is near or below freezing. When this occurs it has been a common practice to activate the reversing valve and remove heat from the system, "dumping" the heat into the outdoor coil to melt the ice. The equipment has usually been left in this defrost mode until the coil temperature reached 75°, or some suitable temperature, to indicate an effective defrost operation had taken place. However if the wind is blowing, it may cool the outdoor coil and "fool" the system. Thus the system would stay in the defrost mode for hours or days, rendering the system ineffective at lower temperatures.

It is therefore a principal object of this invention to provide a heat pump control system which provides an effective defrost cycle operation, without staying in the defrost cycle for an extended time period.

Another important object of the invention is to provide such a heat pump control system in which the "balance point" temperature (below which the heat pump cannot satisfy the call for heating, and supplemental heat must be provided) can be simply set by the installer and/or the ultimate user of the system.

Another salient object of the invention is to provide such a heat pump control system which, when added to an existing heating system, is simply modified to move up the standby-heat temperature setting, below which the compressor is prevented from operating and standby heat is added to the supplemental heat.

SUMMARY OF THE INVENTION

The control system of this invention is particularly useful with a heat pump system including an outdoor coil, an indoor coil, and a compressor for receiving low pressure gas from a suction line and for providing high pressure gas to a discharge line. A reversing valve is operable in a first position to pass the high pressure gas through the outdoor coil in the cooling cycle, and is operable in a second position to pass the high pressure gas through the indoor coil in the heating cycle. A thermostat is positioned to sense the temperature in the space served by the indoor coil. The control system of this invention is connected to regulate operation of the compressor and the reversing valve, and other components.

In particular the control system comprises a timer control circuit, including an input stage for starting the timing interval when an output signal is received, an output stage for delivering an output signal at the expiration of the timing interval, and circuit components for establishing the timing interval duration. Means is coupled between the thermostat and the timer control circuit input stage for starting the timing interval when the thermostat provides a compressor turn-off command. A memory means is also provided, and it has an output connected to regulate compressor operation and an input connected for regulation by the timer control circuit, to insure the compressor cannot be restarted before the expiration of the timing interval.

THE DRAWINGS

Further objects and aspects of the invention will be understood in the light of the following description, taken in conjunction with the accompanying drawings, in the several figures of which like reference numerals identify like components, and in which.

GENERAL HEAT PUMP DESCRIPTION

Figure 1:
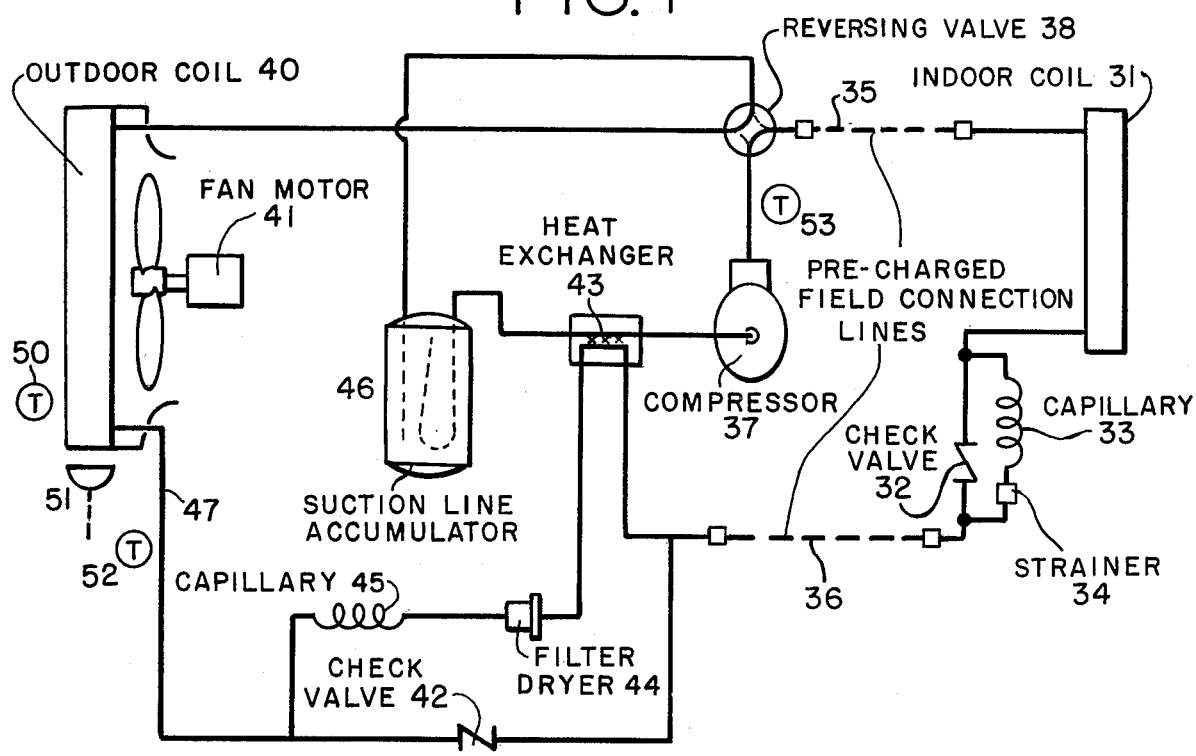
FIG. 1 is a block diagram of a heat pump system and certain sensors, useful in understanding the invention.

FIG. 1 depicts major components of a heat pump system for either heating or cooling a space as heat is extracted from or pumped into an indoor coil 31. Also at the indoor location is a check valve 32. A capillary tube 33 is coupled in series with a strainer 34; the capillary and strainer effectively bypass the check valve. The indoor equipment is connected over a pair of precharged field connection lines 35, 36 with the remaining equipment.

A compressor 37 has its discharge line coupled to one side of a reversing valve 38, which as illustrated is positioned for the heating cycle flow. An outdoor coil 40 and an outdoor fan with a motor 41 are positioned to extract heat from, or discharge heat into, the outdoor air. In the illustrated heating position, with the indoor coil functioning as a condenser, the liquid returning through check valve 32 and line 36 is blocked by check valve 42, but passes through heat exchanger 43, filter-dryer 44 and capillary line 45 to the outdoor coil 40, which functions as the evaporator on the heating cycle. The low-pressure gas is then returned from the outdoor coil 40 over reversing valve 38, suction line accumulator 46, and heat exchanger 43 to the low pressure side of compressor 37.

To effect cooling, reversing valve 38 is repositioned to discharge the hihg-pressure gas through outdoor coil 40, which now operates as the condenser. The liquid is returned through check valve 42, line 36, strainer 34 and capillary 33 to the indoor coil 31, which now operates as the evaporator. The low-pressure gas from coil 31 is then returned over line 35, reversing valve 38, accumulator 46 and heat exchanger 43 to compressor 37.

The components described above are well known and understood in the art. The present invention is particularly directed to a control system for the heat pump arrangement, especially to a control system combined with particular data sensors. To this end a first temperature sensor or thermistor 50 is positioned adjacent outdoor coil 40 to sense the ambient temperature of the outdoor atmosphere. A pressure differential switch 51 is also positioned adjacent coil 40 to sense the difference in the air pressure across the outdoor coil. Another temperature sensor 52, which can be another thermistor, is positioned adjacent the line 47 to sense the temperature of the liquid in the line. Another thermistor or temperature sensor 53 is positioned as shown for providing a signal which varies as the temperature in the discharge line of the compressor. It is emphasized that this thermistor 53 provides information in addition to that provided by the usual high-pressure cut-out switch (which will be described in connection with FIG. 2), and thus is not a substitute for the information normally derived from that switch.

GENERAL ARRANGEMENT OF THE INVENTION

Figure 2:
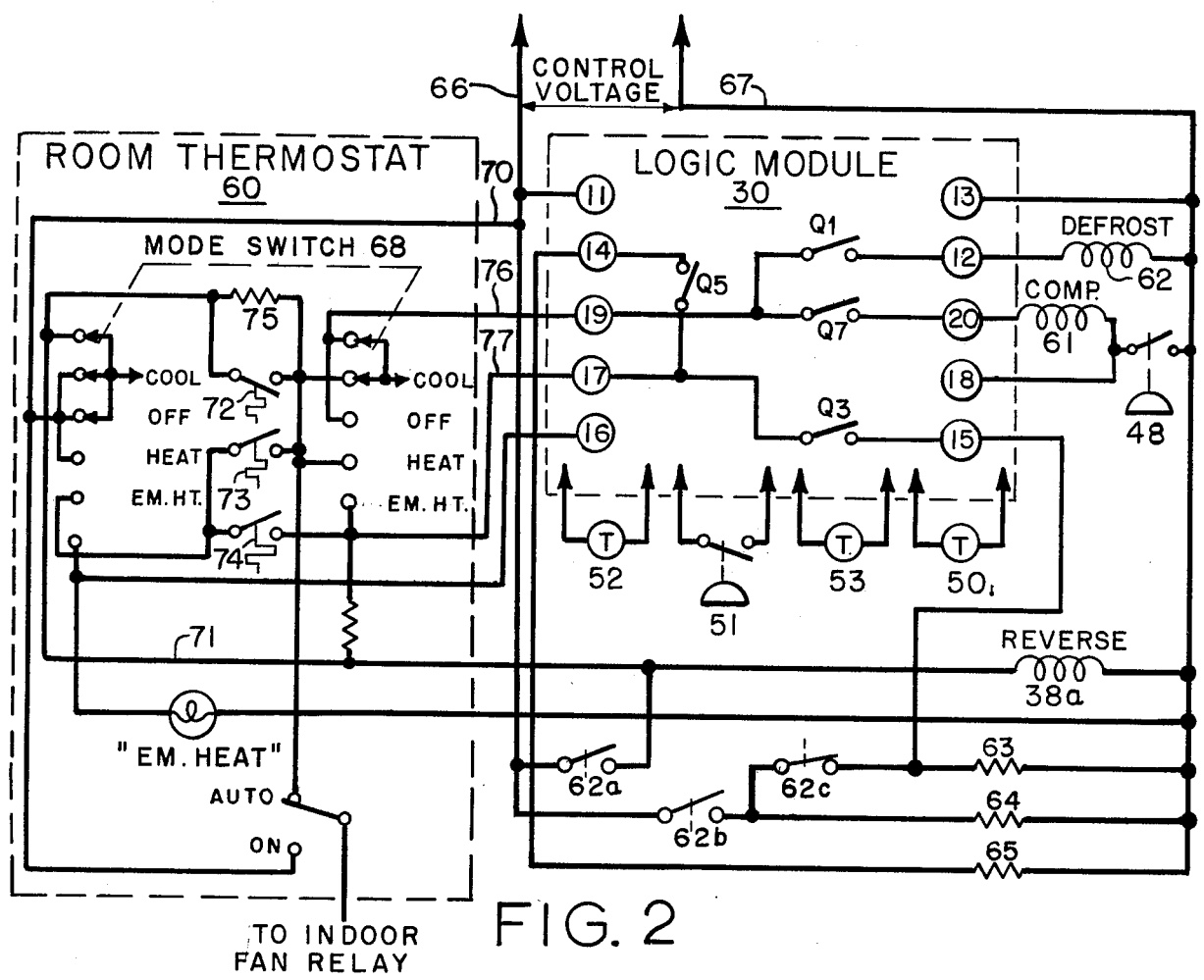
FIG. 2 is a simplified schematic diagram illustrating the control system of this invention coupled with a thermostat and heat pump control components.

FIG. 2 indicates the general interconnection of a logic module 30, a major component of the control system of this invention, with the just-described sensor 50–53, and a room thermostat 60, which in this embodiment is of the manual change-over type. Logic module 30 includes a plurality of terminals numbered 11–20, the better to correlate the general showing of FIG. 2 with the more detailed schematic diagrams of FIGS. 3A and 3B. At the right side of FIG. 2 the usual high-pressure cut-out switch 48 for the compressor discharge line is shown, to emphasize that temperature sensor 53 provides information different than, and in addition to, that available from the cut-out switch 48.

Within the logic module are four "switches" Q1, Q3, Q5, and Q7. Although represented as simple mechanical switches, in a preferred embodiment the switches were triacs for passing current in either direction in response to application of a suitable gate signal and potential difference across the triac. Winding 61 is the winding of a "compressor run" relay, so that when winding 61 is energized a contact set (not shown) is closed to complete an energizing circuit for the compressor motor. Similarly winding 62 is the operating winding of a "defrost" relay which, when energized, opens a normally-closed contact set (not shown) for the outdoor fan motor 41 (FIG. 1) to prevent operation of the condenser fan motor in the defrost cycle. In addition actuation of the defrost relay closes the normally opened contact sets 62a and 62b, and opens the normally closed contact set 62c. The elements 63, 64 and 65, shown as simple resistors, are heating components used in the supplemental and standby heating as will be explained hereinafter.

In general a control voltage of 24 volts is provided across the conductors 66 and 67 to energize the control system of this invention. In the showing of FIG. 2, mode switch 68 of the room thermostat is in the "cool" position. In this position a circuit is completed from line 66 over line 70, the upper left contacts of the mode switch, and line 71 to one side of winding 38a for actuating reversing valve 38; the other side of this winding is coupled to line 67. Thus in the cooling position of the mode switch the reversing valve 38 is actuated to the position opposite that shown in FIG. 1.

Considering FIG. 2 again, it is evident that if switch Q7 is closed with the thermostat mode switch 68 in the illustrated "cool" position, and high-pressure cut-out switch 48 is closed indicating the compressor discharge pressure is below a predetermined cut-out value, an energizing circuit is completed for the compressor relay winding 61. This circuit extends from conductor 66 over conductor 70, the switches at the upper left of the mode switch, the cooling stage contacts 72 (which are in parallel with the heat and cool anticipation resistor 75), the upper right contacts of the mode switch, conductor 76, terminal 19 of the logic module, Q7, terminal 20, winding 61 and contact set 48 to conductor 67. THus the compressor motor will be energized and the compressor will be driven when the mode switch 68 is in the cool position and contact set 72 is closed. If the switch Q7 is open, then the compressor motor relay winding 61 cannot be energized. It is also apparent that if the mode switch 68 is displaced downwardly into the "heat" position, an energizing circuit for relay winding 61 can be completed over the first heating stage contacts 73.

From the foregoing it is apparent that the potential on conductor 66 can be extended over conductor 70 and the thermostat contacts to terminal 19 of the logic module 30. It is further apparent that if switch Q1 is closed, this will complete a circuit over terminal 12 of the logic module to the left side of defrost initiate relay winding 62, the other side of which is coupled to conductor 67. For the present it is sufficient to note that the closure of switch Q1 in effect initiates the defrost cycle of the equipment.

In general the other switches Q3 and Q5 are used to regulate the supplementary and standby heating functions. Considering switch Q3, this switch is closed in the event the system is calling for heat and the heat pump is not able to supply the amount of heat necessary to warm the interior space. With the mode switch 68 in the heat position, it is apparent that the circuit previously established over line 71 to the reverse winding 38a is interrupted. If the system is in the heating mode, and switch Q3 is closed, a circuit is completed over conductor 66, conductor 70, the lower left contacts of the mode switch 68, and second stage thermostat contacts 74, conductor 77, terminal 17 of the logic module 30, switch Q3, terminal 15, and resistor 63 to the conductor 67. Although depicted as a simple resistance 63, this symbol actually represents a heat sequencing system where, as current continues to pass through the sequencer, electric heating is brought on in approximately five kilowatt steps to augment the heat being supplied by the heat pump system. Such supplemental heat is normally provided in increments, such as five kilowatt increments, to preclude the placing of a large load instantly on the power distribution system. This is also helpful when the system is shut down and recycled after a power interruption, as it militates against a larger number of loads being thrown simultaneously on the line which might cause an overload and another interruption of power.

One way to bring on the lowermost heating unit 65 is to displace the mode switch 68 downwardly into the emergency heat position and close the switch Q5 in the logic module 30. When both these conditions are present, the circuit from conductor 66 is extended over conductor 70, the lower left set of contacts of the mode switch, and the emergency heat lamp to conductor 67. In addition, in parallel with the emergency heat indicator, the circuit is extended as previously over the second stage thermostat 74 and conductor 77 to terminal 17 of the logic module. When Q5 is closed, this completes the circuit over Q5, terminal 14 and resistance element 65 to conductor 67, to energize the standby (emergency) heat. Heating element 65 can also be energized automatically, for example, when an outside temperature of −10° F. or less is sensed.

DETAILED DESCRIPTION OF THE INVENTION

Figure 3A:
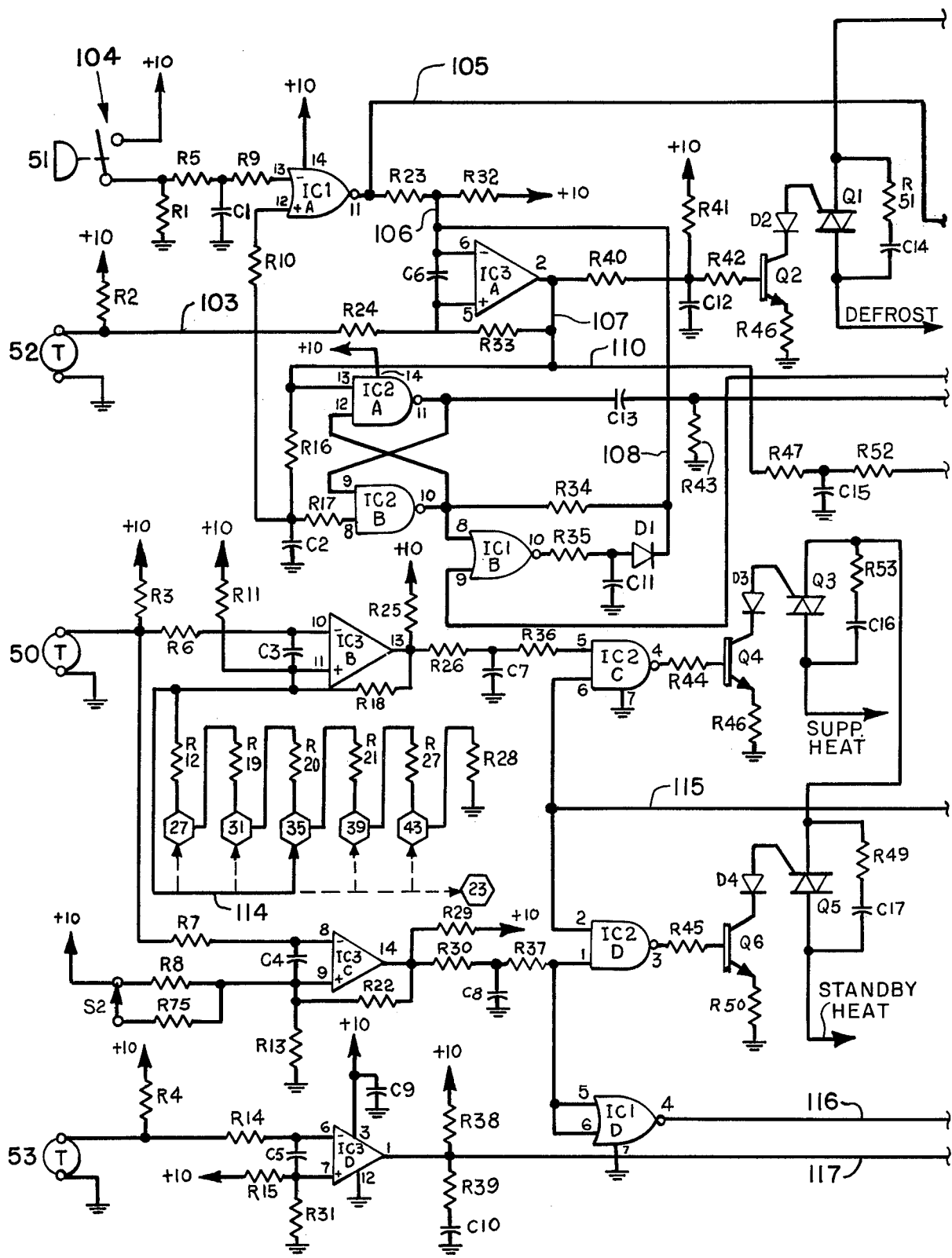
FIGS. 3A and 3B together comprise a schematic diagram depicting circuit details of the control system of the invention.
Figure 3B:
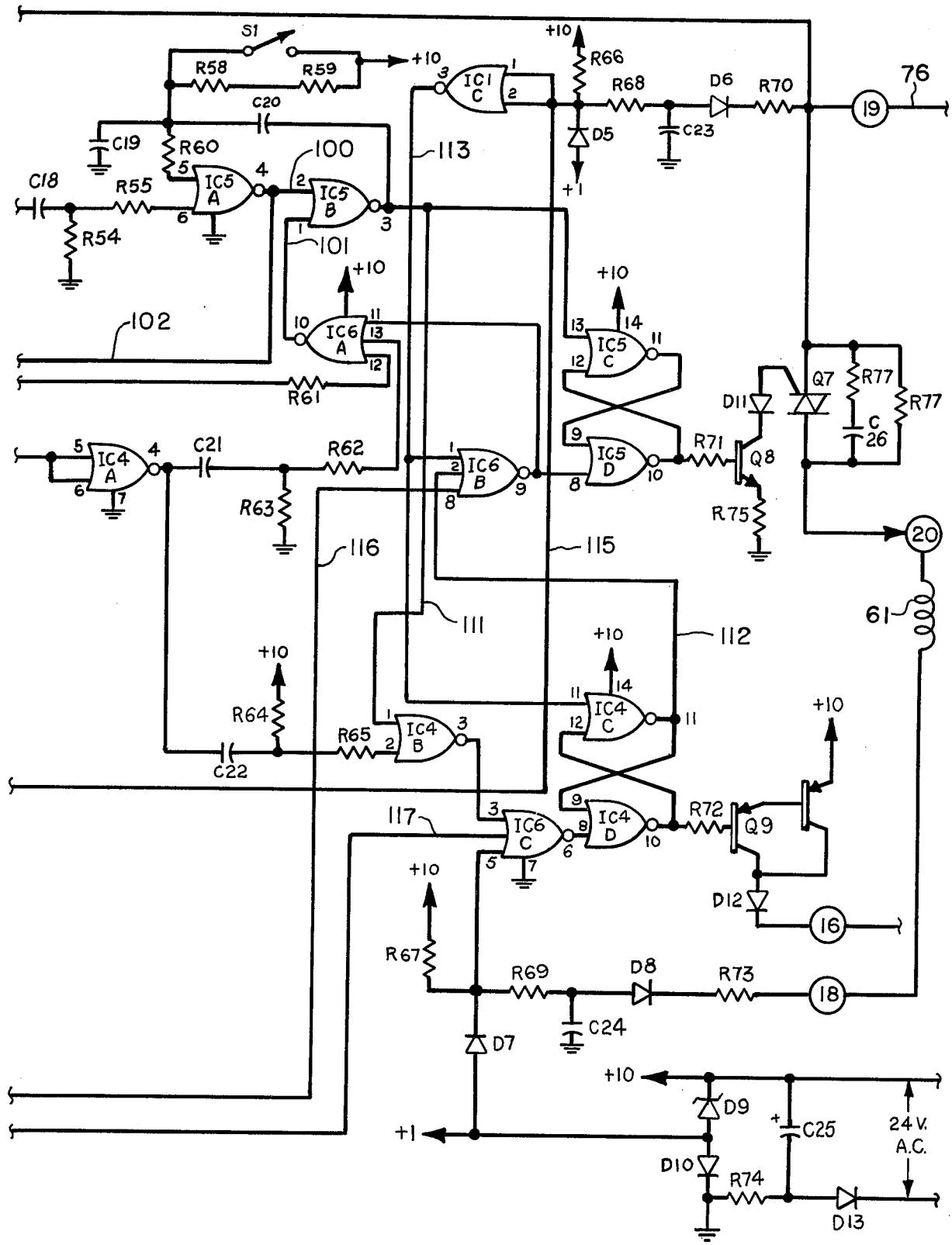

To assist those skilled in the art to make and use the invention with a minimum of experimentation, the schematic details of logic module 30 are shown in FIGS. 3A and 3B. The usual parts designations — such as IC1A for an integrated circuit, R1 for a resistor, C1 to identify a capacitor, and so forth, are used in the drawings.

An important component of the control system of this invention is the timer, or timer control circuit, including an input stage IC5A and an output stage IC5B, with capacitor C20, shown in FIG. 3B. The timer operates so that, when an input signal is received over line 100 or line 101 to switch NOR gate IC5B, the output goes low to establish a charging circuit for C20 which also includes R58 and R59. The values of the components (such as C20, R58 and R59) in the charging circuit are selected to establish a preset interval of five minutes. The potential between capacitors C19, C20 at the end of the charging period provides a signal to pin 5 of IC5A which switches this stage, providing a signal over line 100 and, over line 102, to the pin 9 input of IC1B (FIG. 3A) which is a portion of the defrost circuit. It will become apparent that this NOR gate IC1B is associated with a memory circuit comprising stages IC2A and IC2B, connected in a flip-flop arrangement as shown.

Switch S1 is shown connected so that, upon closure of the switch, resistors R58 and R59 are shorted out to reduce the timing interval duration to virtually zero. Such a switch enables one servicing the unit to reduce the five minute timing interval to only a second or two, avoiding the necessity of waiting for the timing control circuit to complete its cycle each time a particular operation is to be checked. Of course terminals can be provided adjacent resistors R58, R59 in a position for shorting by a screwdriver, electrical lead or other means to correspondingly reduce the duration of the timing interval. For purposes of this explanation, S1 represents a means, connected in the timer control circuit, for modifying the value of some circuit component to correspondingly modify the duration of the timing interval.

Considering the defrost sequence, IC3A (FIG. 3A) is connected as a Schmitt trigger circuit with a pair of inputs. Two conditions are necessary to initiate a defrost cycle. First, the liquid line temperature from the outdoor coil 40 (FIG. 1) has to be below 35° F.; this is indicated by the signal supplied from thermistor 52 between conductor 103 and the ground connection. The other condition required is that the static pressure in the outdoor coil unit, as sensed by pressure switch 51, has to be below a preset level. In a preferred embodiment this level was established as ½ inch of water, which is below atmospheric pressure. This condition is signalled by the closing of the contact set 104 to complete a circuit from ground over resistor R1 and contact set 104 to the plus 10 volt supply. The integrator circuit R5, C1 insures that the contact set 104 must remain closed for about 10 seconds to provide a sufficiently high signal to switch IC1A, causing its output signal on lines 105 and 106 to go low. This establishes the proper reference voltage at the negative input terminal of IC3A. If the liquid line temperature is also below 35° F. at this time, as indicated by the signal passed over line 103 to the positive input terminal of IC3A, then this stage switches and the signal at its output terminal 2 and conductor 107 goes high. It is evident that this output signal is passed over resistors R40, R42 to drive on transistor Q2, and thereby provide gate drive for the triac Q1, which is rendered conductive and completes an energizing path over terminal 12 (FIG. 2) to energize the defrost relay winding 62. At this time the defrost relay is energized, and the compressor continues to run.

Considering the memory circuit including flip-flop IC2A and IC2B, it is apparent that the state of this flip-flop, by determining whether the potential at output pin 10 of IC2B is high or low, in effect determines which of two resistors R34 is coupled over line 108 both to the common connection between resistors R23 and R32, and to the input terminal 4 of IC3A. Hence it is apparent that the state of the flip-flop IC2A, IC2B determines the potential at input terminal 4 of Schmitt trigger IC3A. When the defrost initiate signal is first provided by stage IC3A — when the system is not then defrosting, and even after the defrost initiate signal is received — the memory circuit or flip-flop IC2A, IC2B does not respond, but remains in its quiescent stage. This memory flip-flop is only utilized in the defrost termination cycle. Such termination can occur for either one of two reasons. First, the liquid line temperature, as indicated by the signal from thermistor 52 on line 103, will have reached 75° F. Second, the liquid line temperature as indicated over line 103 will have reached a threshold temperature of 45° F. and remained there for at least the period required for the timer circuit to run. It is emphasized that either of these two events will provide a defrost termination cycle.

For example, let it be assumed that the temperature sensed by thermistor 52 has been below 35° F., and the pressure switch 51 has been closed for more than 10 seconds and Q1 has been switched on to energize the defrost relay. At this time, the temperature in the liquid line 47 begins to rise. This temperature usually remains near the freezing point, 32°, but as the ice melts off, the temperature begins to rise. When the temperature as sensed by thermistor 52 reaches 45°, a signal is provided over line 103 to the plus input terminal of Schmitt trigger IC3A, causing its output (pin 2) to momentarily drop low. The output level had been high, but it switches low, sending a signal over line 107 to the memory flip-flop IC2A, IC2B, which causes this flip-flop to toggle to the opposite state, switching the output level at pin 10 of IC2B from its normal low level to a high level. This high level signal is fed back over line 108 to the negative input of IC3A, thus switching stage IC3A back up high again. It had been switched low, and then sent that signal down to memory flip-flop IC2A, IC2B. This flip-flop was toggled and remembered that switching, and then in turn switched IC3A back up again. Looking at the output (pin 2) of IC3A, it was at plus 10 volts, and would have dropped low (near 1 volt) for a moment, and then risen right back up high again. This switching has set a memory, noting receipt of the threshold 45° signal; this 45° temperature was passed.

The next time IC3A switches low will be upon receipt of a cycle-termination signal at 75° F. At 75° F, IC3A is switched low and remains low, changing the state of IC2A, IC2B to erase the memory. As the temperature passed the 45° threshold, IC3A was switched and flip-flop IC2A, B changed state. This provided a signal at pin 11 of IC2A which was differentiated by C13, R43, and fed through an OR gate IC6A (FIG. 3B) to IC5B, thus starting the five minute timer. At the termination of the C20 charging period a signal is applied to IC5A, which is switched and returns a signal to IC1B, pin 9, switching IC1B to switch IC3A, and terminate the defrost cycle. The five-minute period was initiated by the signal from IC2A, pin 11. The period was terminated by the signal from the output of IC5A, feeding back over line 102 into NOR gate IC1B. When the signal at pin 8 of IC1B is low and the signal at pin 9 goes low, indicating the timer has completed its cycle, the output of IC1B goes high. When that output goes high, the signal is passed over line 108 to the negative terminal of IC3A, causing the output of IC3A to go low. This removes drive from Q2 and terminates the defrost cycle.

There are actually four uses of the timer circuit IC5B, C20 and IC5A. The first is to time the defrost interval, and is initiated when the signal from thermistor 52 indicates the 45° threshold has been reached. This sequence has been described. The second timer function is to provide a five-minute interval commencing at the expiration of the defrost cycle; if there is another call for defrost within this five-minute interval, Q7 is deenergized to shut down the compressor. The NOR gate IC4B is used in this second timing function.

When the defrost cycle is terminated as IC3A is again switched low, this low-level output signal at pin 2 of IC3A is passed over line 107 to set the memory flip-flop IC2A, B, and is also passed from line 107 over line 110, to integrator R47, C15. This signal is inverted in IC4A (FIG. 3B) and the resultant positive signal is differentiated by C21, R63 to provide, through IC6A, a timer turn-on signal. It is noted that differentiator C22, R64 is also connected to the output of IC4A, but R64 is coupled to the +10 volt supply, while R63 is connected to ground. Hence C21, R63 will pass only positive-going pulse signals, and C22, R64 will pass only negative-going pulse signals. With the timer turn-on signal, the output of IC5B goes low, and this low-level signal at pin 1 is the "timer-running" signal.

If a second call for defrost occurs while the timer is still running, timing the interval after termination of the first defrost cycle, IC3A is switched high, and this signal is passed over lines 107, 110 to stage IC4A, where the signal is inverted. The low-going signal is differentiated by C22, R64, and this "second-call-for-defrost" signal is applied to pin 2 of IC4B. As there is presently a low-level ("timer-running") signal at pin 1 of IC4B, this stage provides an output signal which is passed through OR gate IC6C to the "fault" memory flip-flop IC4C, IC4D, thus toggling this flip-flop. Each time IC4C, D is switched, it indicates some fault has occurred. After being switched, the output signal at pin 10 of IC4D provides a signal to drive on the Darlington pair Q9, and pass a signal over terminal 16 of the logic module to the thermostat, completing an energizing path for the "emergency heat" lamp. This lamp is illuminated to indicate there is a system malfunction, as the mode switch has not been displaced to the emergency heat position. The signal at pin 11 of IC4C is passed over line 112 and OR gate IC6B to toggle the "compressor run command" memory comprising flip-flop IC5C, IC5D. The output signal at pin 10 of IC5D goes low, turning off Q8 and removing gate drive from Q7. Thus the "compressor run" relay winding 61 is deenergized.

When the signal was passed through OR gate IC6B to switch IC5C, D, the output of IC6B is also passed through OR gate IC6A to start the timer. The compressor cannot be restarted until the interval times out and a signal from IC5B resets the memory flip-flop IC5C, IC5D. Thus this compressor-anti-recycle feature is the third function which utilizes the timing circuit.

Compressor recycling is also prevented if the thermostat calls for either heating or cooling within five minutes of the last compressor shutdown. When the thermostat contact set opens, the voltage level on line 76 and terminal 19 changes, and a signal is passed through NOR gate IC1C, OR gate IC6B and stage IC6A, to switch IC5B and begin timing the five-minute interval.

The heat pump system is capable of supplying the necessary cooling load, and is also capable of providing all the heat required when the ambient temperature is above about 35° F.; this temperature, below which supplementary heat is brought on by energizing Q3, is termed the balance point. The compressor and the supplementary (electric) heat are sufficient down to some design point, or minimum temperature setting, such as −10° F. Below the design point, the compressor is deenergized and standby heat is brought on to augment the supplemental heat.

Considering first the supplemental heat triac Q3, this receives gate drive from Q4 when the output of NAND IC2C goes high in response to either one of its inputs going low. The conditions at input terminal 5 of IC2C will be considered first. R26, C7 and R36 together comprise a filter circuit which provides a time delay of about ten milliseconds. Thus any voltage transients or "spikes" that might pass through differential amplifier IC3B as a false trigger would not pass through IC2C to drive on Q4 and turn on Q3.

The output at pin 13 of IC3B is normally high in its quiescent state. When IC3B is switched, its output goes low. The input circuit of IC3B is really a Wheatstone bridge arrangement. Input 10 of IC3B is connected over R6 to one side of the bridge, at the common connection of R3 and thermistor 50, positioned to respond to the outside air temperature. The other input, pin 11, is connected to the other side of the bridge, at the common connection of R11 and the combination of R28 with whichever ones of the series-connected resistors R12, R19, R20, R21 and R27 that are not shorted out by the connection of line 114. As shown line 114 is coupled to the hexagonal terminal connection "35" in the decade selector, which is a step-adjustable variable resistance. In this position R12, R19 and R20 are shorted out; the series circuit of R21, R27 and R28 thus forms one leg of the bridge. The different hexagonal terminal connections 23, 27, 31, 35, 39 and 43 represent different balance point temperatures. It is advantageous to use a step-increment selector, rather than a continuously variable resistor, to set the design point. A variable resistor, like a potentiometer, depends upon occasional movement to remain operational. However the four-degree increment selector of the illustrated arrangement can remain untouched for years, and a good electrical connection can easily be effected by changing the engagement of lead 114 to another terminal. Generally the lead 114 will be plugged into terminal 35, to set a balance point temperature of 35°, when the logic module is produced at the factory. Later a serviceman or homeowner can adjust the setting, but most likely it will not be changed more than once, or perhaps twice. As long as the outdoor temperature is above the balance point temperature as set by the connection of lead 114, the pin 5 input of IC2C remains at plus 10 volts and the supplementary heat triac Q3 is not energized. If the outdoor temperature drops below that balance point, then IC3B is switched, pulling down the voltage at its output terminal 13. This causes IC2C to switch, driving Q4 on to provide gate drive to Q3 and bring on the supplemental heat. Stage IC3B is a Schmitt trigger, and has a hystersis of about 2°. With lead 114 set on the 35° terminal, it would deenergize at 36° an energize at 34°. There is about a degree on either side of the nominal balance point.

There is an alternate path to bring on supplemental heat from a thermostat signal received over line 115. That is the other way that IC2C can be switched, by opening the first stage of the thermostat which provides an indication at logic module terminal 19. A d-c level is produced at that terminal by virtue of rectifier D6, filter R68, C23 and a clamp D5. This circuit monitors terminal 19 and indicates whether the thermostat contact set is open or closed. If the thermostat contact set is closed, the input to IC1C is at plus 10 volts; when the thermostat is opened, this voltage level is essentially at ground. Whenever that voltage goes to ground, it provides a signal over line 115 to switch both IC2C and IC2D, energizing Q3 and Q5 to bring on both the supplemental and standby heat. This can only occur with the thermostat mode switch in the emergency heat position. When it is switched to emergency heat, the first stage of the thermostat is opened and the second stage is controlling. The only time that condition can exist is when the emergency heat selector switch is moved to that position. Accordingly if the second stage of the thermostat is controlling, and the first stage is open, that denotes an emergency heat condition. In the usual control of heat, to get to the second stage, the first stage must initially be closed. The signal on line 115 denotes a call for standby (emergency) heat elements and the supplemental heat elements must be energized. This command on line 115 overrides the signal from thermistor 50, and energizes both triacs Q3 and Q5.

Another differential amplifier IC3C is connected as a Schmitt trigger, and is also coupled to the same outdoor air thermistor 50. IC3C also has a Wheatstone bridge input circuit, but the reference leg is not adjustable; it has a fixed reference R13. IC3C is set to switch when the temperature sensed by thermistor 50 reaches $-10°$ F. At this time the voltage at pin 14 of IC3C drops low, switching IC2D to drive on Q6, providing gate drive to Q5 and energizing the standby heat. Whenever the standby heat is brought on the compressor is deenergized. The signal from IC3C is also passed through a NOR gate IC1D which sends a command over line 116, and OR gate IC6B to the compressor run command memory flip-flop IC5C, IC5D. This in turn deenergizes Q7. Thus whenever the emergency heat is on, the compressor is turned off to prevent circuit overload. Thermistor 53 is positioned to sense the compressor discharge line temperature. Thermistor 53 is part of a Wheatstone bridge circuit. The reference leg R31 is not adjustable, but is set to provide switching of IC3D when the discharge line temperature reaches 275° F. Thus if the discharge line temperature reaches 275° F., Schmitt trigger IC3D switches and provides a signal over line 117 and OR gate IC6C to the fault memory IC4C, IC4D, to turn off the compressor. Whenever the safe discharge temperature is exceeded, Q7 is deenergized, and the fault memory prevents it from resetting itself. It will remain in that state, and the emergency heat light on the thermostat is lighted to indicate that an abnormal operation condition has occurred. It will remain in that state until someone recycles the thermostat and extinguishes the lamp. That is the same lamp which indicates that the emergency heat is energized. However if that thermostat mode switch has been intentionally displaced to the emergency heat position, this is known to the occupant. However if the occupant notices the emergency heat lamp is on, but nobody has moved the switch, it must indicate an abnormal operating condition.

In the lower left portion of FIG. 3A, resistors R8 and R75 are shown connected in parallel, and this parallel combination is coupled between the +10 volt supply line and the positive input terminal of IC3C. The reference voltage established at the positive input terminal of op amp IC3C sets the minimum temperature control point (approximately $-10°$ F.) below which the compressor is locked out and both the supplemental and standby heat are energized. This applies when using a fossil-fueled furnace. There is some heat developed by the system in the range from $-10°$ F. to about $+20°$ F., even though the system coefficient of performance (C.O.P.) is such that the heat pump is less efficient below approximately the 20° level. Accordingly where the heat pump system is added to an existing installation, the relative values of R8 and R75 are such that the minimum temperature control point is raised from $-10°$ to about $+20°$ when R75 is removed from the circuit. This has been done, in one embodiment, by providing R75 with extended leads, and positioning it slightly above the circuit board with the resistor R8 adjacent the circuit board. By simply clipping the leads to R75 it can be removed from the circuit and the minimum temperature control point raised as described. Thus the described mounting of R75, or use of S2, represents a simple means for affording field modification of the system to raise the minimum temperature point to the range where the compressor is disabled when the heat pump system becomes less efficient, and the previously installed heat units then supply all the heat below that temperature. Alternatively a switch such as S2 can be connected as shown, so that opening the switch removes R75 from the circuit.

In the appended claims the term "connected" means a d-c connection between two components with virtually zero d-c resistance between those components. The term "coupled" indicates there is a functional relstionship between two components, with the possible interposition of other elements between the two components described as "coupled" or "intercoupled."

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A heat pump system including an outdoor coil, an indoor coil, a compressor for receiving low pressure gas from a suction line and for providing high pressure gas to a discharge line, a reversing valve connected in the discharge line, operable in a first position to pass the high pressure gas through the outdoor coil in the cooling cycle and operable in a second position to pass the high pressure gas through the indoor coil in the heating cycle, means for energizing supplemental heat below a balance point temperature and means for energizing standby heat below a minimum set point temperature, a thermostat positioned to sense the temperature in the space served by indoor coil, and a control system connected to regulate operation of the compressor, the reversing valve, and the supplemental and standby heat, which control system comprises:

a timer control circuit, including an input stage for starting the timing interval when an input signal is received, an output stage for delivering an output signal at the expiration of the timing interval, and circuit components including a resistor and a capacitor connected to establish the timing interval duration;

means, coupled between the thermostat and the timer control circuit input stage, for passing an input signal to start the timing interval when the thermostat provides a compressor turn-off command signal;

memory means, having an output connected to regulate compressor operation and an input connected for regulation by the timer control circuit, to insure the compressor cannot be re-started before the expiration of the timing interval; and a trigger circuit connected to provide a defrost-cycle initiate signal and to provide a signal to the timer control circuit input stage when the trigger circuit is switched, a pressure-responsive sensor positioned adjacent the outdoor coil and connected to supply a first signal when the pressure across the outdoor coil drops below a predetermined minimum value, an integrating circuit, coupled between the pressure-responsive sensor and a first input terminal of the trigger circuit, for integrating the first signal and passing a signal to the trigger circuit only after the first signal has been present for a predetermined minimum time, a temperature-responsive sensor provided to sense the temperature in the liquid line connected to the outdoor coil, and means for passing a signal from the liquid line sensor to a second input terminal of the trigger circuit, which trigger circuit switches only in response to the simultaneous presence of low-pressure and low-temperature signals at the trigger circuit input terminals.

2. A heat pump system as claimed in claim 1, and further comprising a memory circuit, connected to be switched initially and commence a defrost-termination cycle in response to switching of said trigger circuit as the signal from said temperature-responsive sensor signifies a threshold temperature has been reached, and to be switched again to end the defrost-termination cycle as determined either by operation of the timer control circuit through the complete timing interval or by the signal from said temperature-responsive sensor signifying a cycle-termination temperature has been reached.

3. A heat pump system including an outdoor coil, an indoor coil, a compressor for receiving low pressure gas from a suction line and for providing high pressure gas to a discharge line, a reversing valve connected in the discharge line, operable in a first position to pass the high pressure gas through the outdoor coil in the cooling cycle and operable in a second position to pass the high pressure gas through the indoor coil in the heating cycle, means for energizing supplemental heat below a balance point temperature and means for energizing standby heat below a minimum set point temperature, a thermostat positioned to sense the temperature in the space served by the indoor coil, and a control system connected to regulate operation of the compressor, the reversing valve, and the supplemental and standby heat, which control system comprises:

a timer control circuit, including an input stage for starting the timing interval when an input signal is received, an output stage for delivering an output signal at the expiration of the timing interval, and circuit components including a resistor and a capacitor connected to establish the timing interval duration;

means, coupled between the thermostat and the timer control circuit input stage, for passing an input signal to start the timing interval when the thermostat provides a compressor turn-off command signal;

memory means, having an output connected to regulate compressor operation and an input connected for regulation by the timer control circuit, to insure the compressor cannot be re-started before the expiration of the timing interval; and a trigger circuit having a Wheatstone bridge arrangement connected in its input circuit, a sensor positioned to sense the outdoor air temperature and connected in one leg of the Wheatstone bridge, and an adjustable variable resistance connected in another leg of the Wheatstone bridge, which variable resistance includes a plurality of series-connected resistors with intermediate terminal connections provided at intervals along the series-connected resistors, and an adjustable lead for connection with one of the terminal connections to regulate the value of the adjustable variable resistance and thus determine the balance point temperature below which supplemental heat is added to the heat produced by the heat pump system, and means, coupled to the output side of the trigger circuit, for providing a signal to energize the supplemental heat when the trigger circuit is switched.

4. A heat pump system including an outdoor coil, an indoor coil, a compressor for receiving low pressure gas from a suction line and for providing high pressure gas to a discharge line, a reversing valve connected in the discharge line, operable in a first position to pass the high pressure gas through the outdoor coil in the cooling cycle and operable in a second position to pass the high pressure gas through the indoor coil in the heating cycle, means for energizing supplemental heat below a balance point temperature and means for energizing standby heat below a minimum set point temperature, a thermostat positioned to sense the temperature in the space served by the indoor coil, and a control system connected to regulate operation of the compressor, the reversing valve, and the supplemental and standby heat, which control system comprises:

a timer control circuit, including an input stage for starting the timing interval when an input signal is received, an output stage for delivering an output signal at the expiration of the timing interval, and circuit components including a resistor and a capacitor connected to establish the timing interval duration;

means, coupled between the thermostat and the timer control circuit input stage, for passing an input signal to start the timing interval when the thermostat provides a compressor turn-off command signal; and memory means, having an output connected to regulate compressor operation and an input connected for regulation by the timer control circuit, to insure the compressor cannot be re-started before the expiration of the timing interval; and a trigger circuit connected such that upon switching a signal is provided to energize the standby heat and also to disable the compressor to prevent compressor operation below a minimum temperature, and means, including circuit components coupled to at least one input terminal of the trigger circuit, for effecting a change in the minimum temperature value below which the compressor is disabled and the standby heat is energized.

5. A heat pump system including an outdoor coil, an indoor coil, a compressor for receiving low pressure gas from a suction line and for providing high pressure gas to a discharge line, a reversing valve connected in the discharge line, operable in a first position to pass the high pressure gas through the outdoor coil in the cooling cycle and operable in a second position to pass the high pressure gas through the indoor coil in the heating cycle, a thermostat positioned to sense the temperature in the space served by the indoor coil, and a control system connected to regulate operation of the compressor and the reversing valve, which control system comprises:

- a timer control circuit, including an input stage for starting the timing interval when an input signal is received, an output stage for delivering an output signal at the expiration of the timing interval, and circuit components for establishing the timing interval duration;
- means, coupled between the thermostat and the timer control circuit input stage, for passing an input signal to start the timing interval when the thermostat provides a compressor turn-off command signal;
- memory means, having an output connected to regulate compressor operation and an input connected for regulation by the timer control circuit, to insure the compressor cannot be re-started before the expiration of the timing interval; and
- a trigger circuit having a Wheatstone bridge arrangement connected in its input circuit, a sensor positioned to sense the outdoor air temperature and connected in one leg of the Wheatstone bridge, and an adjustable variable resistance connected in another leg of the Wheatstone bridge, which variable resistance includes a plurality of series-connected resistors and intermediate terminal connections provided at intervals along the series-connected resistors and an adjustable lead for connection with one of the terminal connections to select the value of the adjustable variable resistance and thus determine the balance point temperature below which supplemental heat may be added to the heat produced by the heat pump system, and means coupled to the output side of the trigger circuit for providing a signal to energize the supplemental heat associated with the heat pump system when the trigger circuit is switched.

6. A heat pump system including an outdoor coil, an indoor coil, a compressor for receiving low pressure gas from a suction line and for providing high pressure gas to a discharge line, a reversing valve connected in the discharge line, operable in a first position to pass the high pressure gas through the outdoor coil in the cooling cycle and operable in a second position to pass the high pressure gas through the indoor coil in the heating cycle, a thermostat positioned to sense the temperature in the space served by the indoor coil, and a control system connected to regulate operation of the compressor and the reversing valve, which control system comprises:

- a timer control circuit, including an input stage for starting the timing interval when an input signal is received, an output stage for delivering an output signal at the expiration of the timing interval, and circuit components for establishing the timing interval duration;
- means, coupled between the thermostat and the timer control circuit input stage, for passing an input signal to start the timing interval when the thermostat provides a compressor turn-off command signal;
- memory means, having an output connected to regulate compressor operation and an input connected for regulation by the timer control circuit, to insure the compressor cannot be re-started before the expiration of the timing interval; and
- a trigger circuit connected such that upon switching a signal is provided to energize the standby heat associated with the heat pump system and also to disable the compressor to prevent its operation below a minimum temperature, and means, including circuit components coupled to at least one input terminal of the trigger circuit, for effecting a change in the minimum temperature value below which the compressor is disabled and the standby heat is energized.

7. A heat pump system including an outdoor coil, an indoor coil, a compressor for receiving low pressure gas from a suction line and for providing high pressure gas to a discharge line, a reversing valve connected in the discharge line, operable in a first position to pass the high pressure gas through the outdoor coil in the cooling cycle and operable in a second position to pass the high pressure gas through the indoor coil in the heating cycle, a thermostat positioned to sense the temperature in the space served by the indoor coil, and a control system connected to regulate operation of the compressor and the reversing valve, which control system comprises:

- a timer control circuit, including an input stage for starting the timing interval when an input signal is received, an output stage for delivering an output signal at the expiration of the timing interval, and circuit components for establishing the timing interval duration;
- means, coupled between the thermostat and the timer control circuit input stage, for passing an input signal to start the timing interval when the thermostat provides a compressor turn-off command signal;
- memory means, having an output connected to regulate compressor operation and an input connected for regulation by the timer control circuit, to insure the compressor cannot be re-started before the expiration of the timing interval; and
- a trigger circuit connected to initiate a defrost cycle and to provide a signal to the timer control circuit input stage when the trigger circuit is switched, a pressure-responsive sensor positioned adjacent the outdoor coil and ocnnected to supply a first signal which is passed to a first input terminal of the trigger circuit when the pressure across the outdoor coil drops below a predetermined minimum value, a temperature-responsive sensor provided to sense the temperature in the liquid line connected to the outdoor coil, and means for passing a signal from the liquid line sensor to a second input terminal of the trigger circuit, which trigger circuit switches only in response to the simultaneous presence of low-pressure and low-temperature signals at the trigger circuit input terminals.

8. A heat pump system as claimed in claim 7, and further comprising a memory circuit, connected to be switched initially and commence a defrost-termination cycle in response to switching of said trigger circuit as the signal from said temperature-responsive sensor signifies a threshold temperature has been reached, and to be switched again to end the defrost-termination cycle as determined either by operation of the timer control circuit through the complete timing interval or by the signal from said temperature-responsive sensor signifying a cycle-termination temperature has been reached.

* * * * *